(12) United States Patent
Hares

(10) Patent No.: US 10,800,037 B2
(45) Date of Patent: *Oct. 13, 2020

(54) MEASURING ROBOT PERFORMANCE

(71) Applicant: CMR SURGICAL LIMITED, Cambridge (GB)

(72) Inventor: Luke David Ronald Hares, Cambridge (GB)

(73) Assignee: CMR Surgical Limited, Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/230,314

(22) Filed: Dec. 21, 2018

(65) Prior Publication Data

US 2019/0126477 A1 May 2, 2019

Related U.S. Application Data

(63) Continuation of application No. 15/373,650, filed on Dec. 9, 2016, now Pat. No. 10,195,739.

(30) Foreign Application Priority Data

Dec. 10, 2015 (GB) .................................. 1521815.9

(51) Int. Cl.
*B25J 9/16* (2006.01)
*B25J 17/00* (2006.01)
(Continued)

(52) U.S. Cl.
CPC ............ *B25J 9/1641* (2013.01); *B25J 9/102* (2013.01); *B25J 9/126* (2013.01); *B25J 9/1692* (2013.01);
(Continued)

(58) Field of Classification Search
CPC . B25J 9/1641; B25J 17/00; B25J 9/102; B25J 9/126; B25J 9/1692; B25J 9/1694;
(Continued)

(56) References Cited

U.S. PATENT DOCUMENTS 4,989,161 A * 1/1991 Oaki ...................... B25J 9/1641
700/261
5,828,813 A * 10/1998 Ohm ......................... B25J 3/04
700/260
(Continued)

FOREIGN PATENT DOCUMENTS

JP        2013154433 A    8/2013

*Primary Examiner* — Jaime Figueroa
(74) *Attorney, Agent, or Firm* — Renner, Otto, Boisselle & Sklar, LLP

(57) ABSTRACT

A robot comprising: a base; an articulated arm extending distally of the base and including two arm members coupled by a joint; a motor; a gearbox having an input shaft coupled to an output of the motor and an output shaft configured to drive relative motion of the arm members about the joint; a position sensor configured to sense relative position of the arm members about the joint; and a control system coupled to the arm configured to drive the motor, the control system being arranged to perform a calibration operation to estimate torque loss in the gearbox by the steps of (i) estimating the inertia of the portion of the arm distal of the joint for motion about the joint; (ii) applying a determined drive power to the motor; (iii) receiving from the position sensor position data indicating the motion of the arm in response to the applied drive power; and (iv) estimating the torque loss in the gearbox in dependence on the estimated inertia, the determined drive power and the position data.

20 Claims, 3 Drawing Sheets

(51) Int. Cl.
  *B25J 9/10*    (2006.01)
  *A61B 34/00*   (2016.01)
  *B25J 9/12*    (2006.01)
  *B25J 19/02*   (2006.01)

(52) U.S. Cl.
  CPC ............ *B25J 9/1694* (2013.01); *B25J 17/00* (2013.01); *B25J 19/02* (2013.01); *G05B 2219/39191* (2013.01); *G05B 2219/41359* (2013.01); *Y10S 901/09* (2013.01)

(58) Field of Classification Search
  CPC ............... B25J 19/02; B25J 13/085; G05B 2219/39191; G05B 2219/41359; Y10S 901/09; A61B 34/70
  USPC .................................. 700/245, 254
  See application file for complete search history.

(56) References Cited

U.S. PATENT DOCUMENTS

| | | | | |
|---|---|---|---|---|
| 6,646,405 | B2* | 11/2003 | McConnell | B25J 9/1635 318/568.2 |
| 2001/0045807 | A1* | 11/2001 | McConnell | B25J 9/1635 318/568.2 |
| 2005/0183532 | A1* | 8/2005 | Najafi | A61B 8/00 74/490.01 |
| 2011/0283825 | A1* | 11/2011 | Corcoran | F16H 25/20 74/396 |

* cited by examiner

MEASURING ROBOT PERFORMANCE

CROSS-REFERENCE TO RELATED APPLICATIONS

This application is a continuation of U.S. application Ser. No. 15/373,650, filed Dec. 9, 2016, and which claims priority to United Kingdom Application No. 1521815.9, filed Dec. 10, 2015, both which are each hereby incorporated herein by reference in their entireties.

BACKGROUND

This invention relates to characterising the performance of a robot.

A typical robot arm comprises a number of rigid limbs, each of which is connected to the next by an articulation which may, for example, be a revolute joint. A motor or other drive mechanism is provided to drive relative motion of the limbs at each joint.

FIG. 1 shows an example of a drive mechanism at a robot arm articulation. The articulation 1 of FIG. 1 is located between a proximal arm member 2 and a distal arm member 3. The arm members are coupled together by a revolute joint defined by a rotation axis 4. An electric motor 5 is mounted in the proximal arm member 2. The output of the electric motor is a drive shaft 6 which connects to the input of a reduction gearbox 7. The gearbox 7 is also mounted in the proximal arm member. The output of the gearbox is a worm shaft 8. Worm shaft 8 engages a drive gear 9. Drive gear 9 is fast with the distal arm member 3 and is disposed about the rotation axis 4. This arrangement allows the motor 5 to drive relative motion of the arm members 2, 3 about the joint. In order to help control the motion of the arm joint, the joint is provided with a position encoder 11 and a torque sensor 10. The position encoder senses the configuration of the joint 1. The torque sensor senses the amount of torque applied about the joint. These values can be fed to a control processor and used as inputs to an algorithm to derive the electrical inputs to the motor 5.

The control processor may be required to control the joint to move into a desired configuration at a particular time. To achieve this the control processor needs to apply an appropriate amount of power to the motor. The power required depends on the inertia of the portion of the arm distal of the joint 1, the distance to be moved and the time over which the movement is to take place. The control processor may be capable of determining these in a known way. Additionally, however, the power required depends on the efficiency of the mechanical linkage between the motor 5 and the drive gear, involving the gearbox 7 and the transmission from the worm 8 to the drive gear 9. This mechanical efficiency is dependent on the meshing adjustment of the gearbox, the level of wear of the gearbox, which will vary over time, and the performance of any lubricant in the drivetrain. If the efficiency of the gearbox is not known then the aim can still be driven to the desired configuration using closed-loop control based on the output of position encoder 11. However, the arm may overshoot the desired configuration and have to be brought back, or fail to reach the desired position by the required time. Failures of the first type are especially important when the arm is part of a surgical robot because they may result in tissue of a patient being unnecessarily disrupted.

Another form of difficulty arises when the torque sensor is being used to sense the torque being applied on the joint 1 by an external force, such as gravity, at the same time as the distal limb is being driven by the motor 5. A torque will be measured about the joint. Part of that torque will be due to the external force and part will be due to the torque applied by the motor. Without knowing the performance of the gearbox 7 it is difficult to estimate the external torque. This may be problematic if the control strategy of the arm is dependent on an estimate of the externally applied torque.

It would be possible to measure the efficiency of the gearbox by providing an additional torque sensor at the input to the gearbox. However, this adds weight, cost and complexity to the arm.

Another alternative would be to remove the gearbox from the aim and measure its losses, but that is time-consuming and can only be undertaken when the arm is not in use.

There is a need for an improved method for estimating the efficiency of a mechanical linkage in a robot drivetrain.

SUMMARY OF THE INVENTION

According to one aspect there is provided a robot as set out in accompanying claims 1 to 13. According to a second aspect there is provided a method for calibrating a robot as set out in accompanying claim 14.

The steps described above may be performed in other orders.

Once the loss in the gearbox has been estimated as described above, the control system may cause the arm to move at a desired rate by determining a power to be applied to the motor. That power may be determined in dependence on the estimated loss. The power may be determined so as to overcome that loss.

BRIEF DESCRIPTION OF THE FIGURES

The present invention will now be described by way of example with reference to the accompanying drawings.

In the drawings.

DETAILED DESCRIPTION

Figure 1:
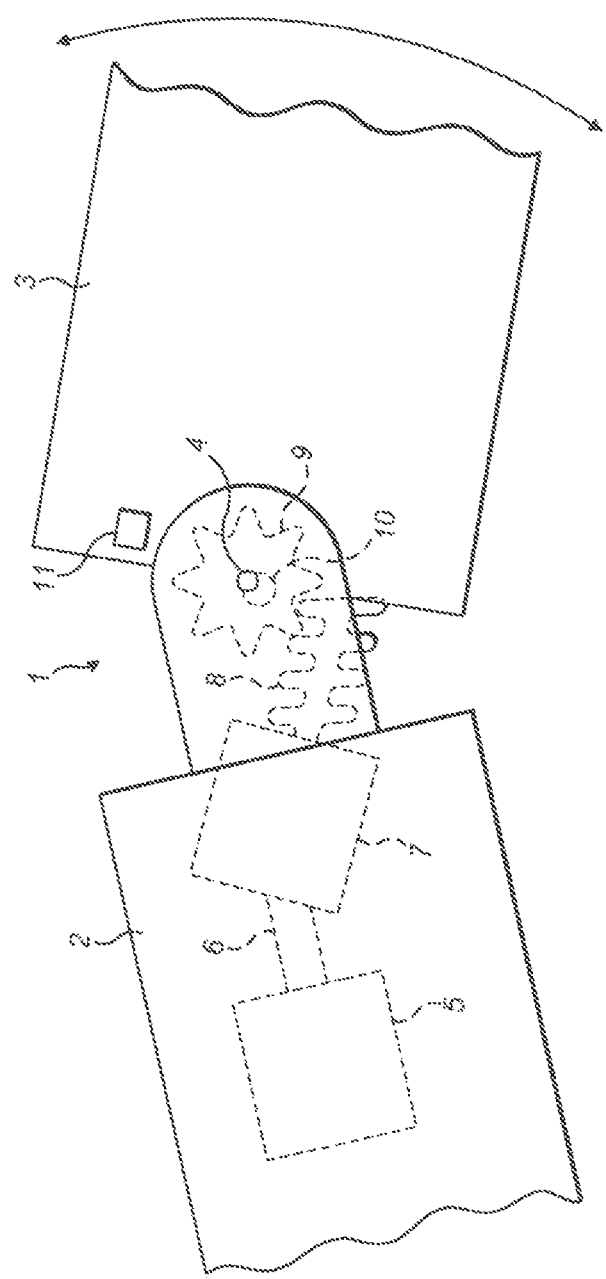
FIG. 1 is a schematic view of a prior art robot arm.
Figure 2:
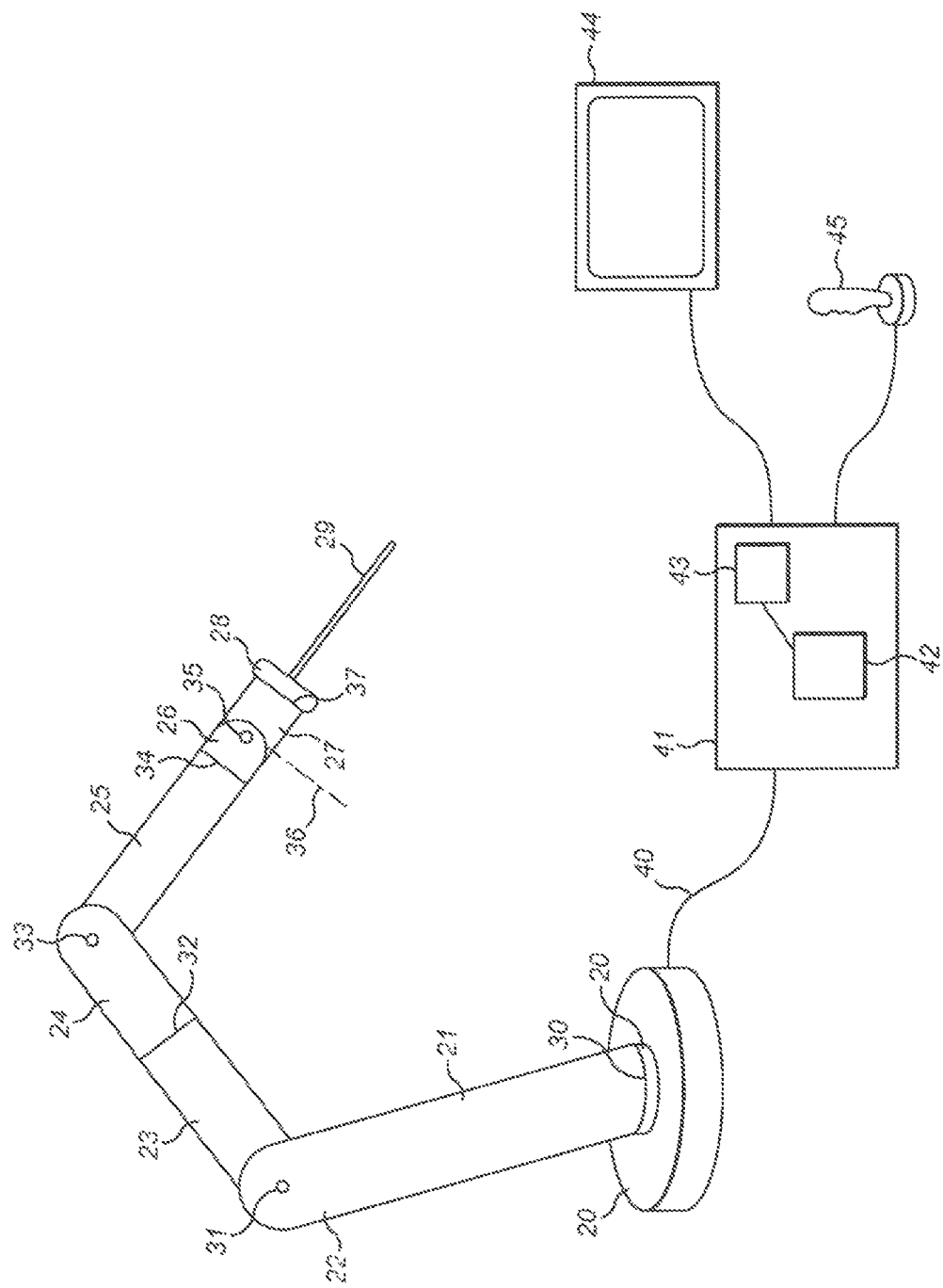
FIG. 2 shows a robot arm including a control system.

In the arrangement of FIG. 2 the robot arm includes a series of rigid members 20-28 which are connected in series, with joints 30-37 between successive pairs of members. As an example, members 24, 25 are interconnected by a revolute joint 33. Joint 33 is shown in more detail in FIG. 3. Relative motion of members 24, 25 at the joint 33 can be driven by motor 51 acting through gearbox 53. A torque sensor 59 measures the torque applied at the joint, and a position encoder (30 senses the positional configuration of the joint. A control unit 41 (FIG. 1 receives signals from the torque sensor and the position encoder and generates drive signals to the motor 51. The control system is configured so as to be capable of driving the arm in such a way as to allow it to estimate the mechanical losses between the motor 51 and joint 33. On way in which this can be done is by measuring the actual motion of the arm about the joint when a known power is applied from the motor. If the joint is driven at varying speed then the inertia of the arm distal of the joint can also be estimated. If the arm has redundant degrees of freedom then an instrument 29 at the distal end of the arm can be kept still whilst the mechanical losses are being estimated, allowing the estimation to be undertaken when the instrument is in use.

The robot arm of FIG. 2 is intended for use in performing surgery. The arm comprises a base 20. The base 20 can be attached to a cart or an operating table or to the floor, wall or ceiling of an operating theatre. The base could be in the form of a clamp. Extending from the base are a series of rigid arm members 21 to 28. The base, and each of the arm members apart from the most distal one 28, is attached to and articulated to the succeeding arm member by a respective revolute joint 30 to 37. Motion about each joint can be driven by a respective motor under the control of the control unit 41. A surgical instrument 29 is attached to the most distal member 28 of the arm. The surgical instrument could, for example, be a cutting, grasping, imaging or irradiating instrument.

The arm has eight joints 30-37 by which the instrument can be moved, providing the arm with redundant freedom of motion. As a result of this redundancy the arm is able to adopt multiple different configurations whilst the instrument remains at a particular position.

The control unit 41 comprises a processor 42 and a memory 43. The memory 43 stores in a non-transient way program code that is executable by the processor 42 so as to cause the processor to perform the functions described herein. The processor is coupled to the arm by a cable 40 to (i) receive signals from the position and torque sensors 60, 59 (via cables 61, 62) and from corresponding sensors on the other joints of the arm; and (ii) transmit signals to drive motor 51 (via cable 50) and the motors associated with the other joints of the arm. The control unit 41 is also coupled to an operator station which has a display unit 44 for displaying data on the state of the arm and a user input device 45 whereby an operator can issue commands to control the operation of the arm. The processor receives the signals from the position and torque sensors and from the user input device. It executes code stored in memory 43 and, in dependence on the received signals, forms output signals to drive the operation of the motors of the arm. For example, if the user manipulates the user input device so as to signal that, the instrument 29 should move upwards, that may result in the control unit 41 driving motor 51 to cause arm member 25 to rotate upwards. The user input device may be capable of providing force feedback to an operator to indicate the amount of resistance being experienced by the arm to a motion being commanded by the operator.

Figure 3:
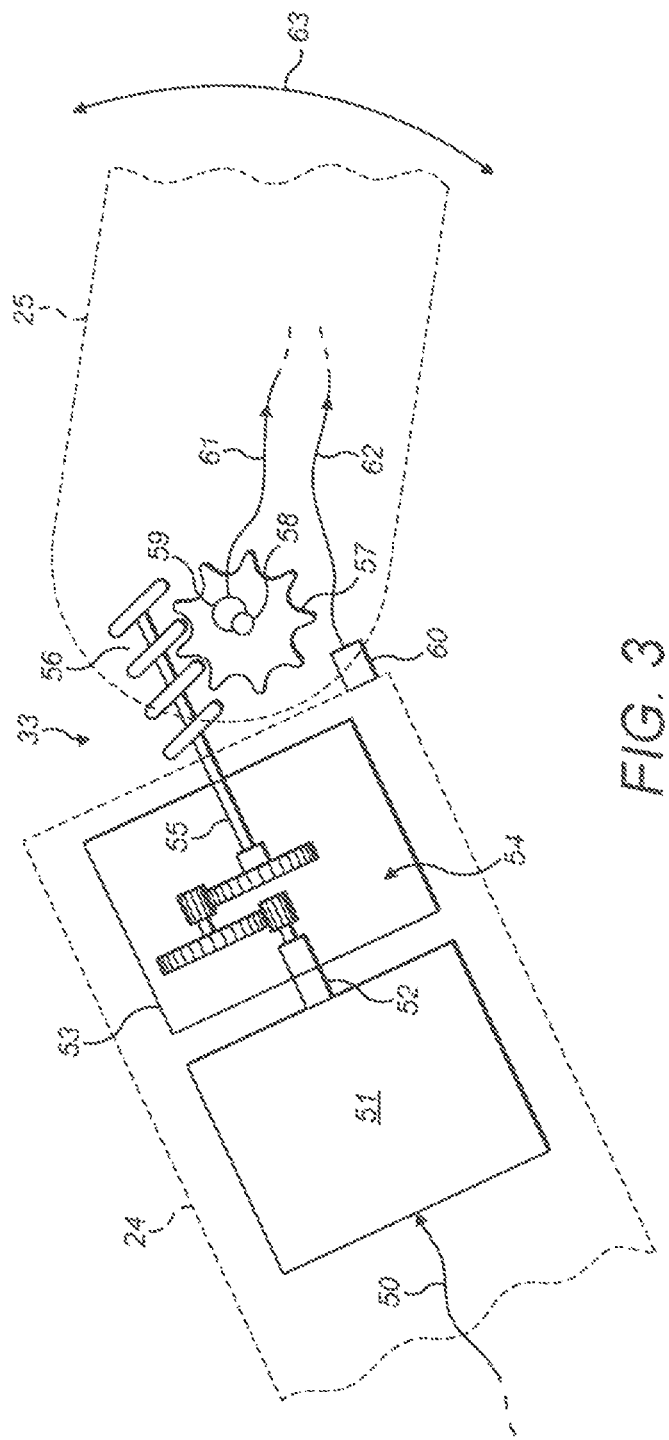
FIG. 3 shows a joint of the arm of FIG. 2.

FIG. 3 shows joint 33 in more detail. In FIG. 3 the arm members 24, 25 are shown by dashed lines so the other components can be seen more clearly. Arm member 24 is in the form of a hollow rigid tube. Motor 51 is located inside the tube and mounted rigidly to the interior of the tube. Motor 51 has electrical inputs provided by cable 50. When a drive voltage is supplied to the motor through cable 50 the motor can be driven to rotate its output shaft 52 relative to the arm member 24. Output shaft 52 of the motor extends to constitute the input shaft of gearbox 53. Gearbox 53 is located inside arm member 24 and is mounted rigidly to the interior of the tube. Gearbox 53 comprises a geartrain 54 constituted by a number of intermediate shafts carrying interlinked gears which convey drive between the input shaft 52 of the gearbox and an output shaft 55 of the gearbox. In this example the gears are arranged so as to cause a reduction in speed from gearbox input shaft 52 to gearbox output shaft 55, but it could be arranged in the opposite way, or could provide multiple gear ratios. The rotation axis of output shaft 55 of the gearbox is orthogonal to the rotation axis 58 between the two arm Members 24, 25. The output shaft 55 extends to constitute a the worm gear 56. The worm gear 56 meshes with a drive gear 57. Drive gear 57 is fast with arm member 25. In this way, rotation of shaft 55 by means of motor 51 results in rotation of drive gear 57 and therefore arm member 25 relative to arm member 24 and about axis 58.

The arm member 24, 25 are coupled together by bearings which define the axis of the joint.

The torque sensor 59 is mounted between drive gear 57 and the body of arm member 25. The torque sensor measures the torque being applied between the arm member and the gear about axis 58. Numerous designs of torque sensor are available and could be used for this application. The torque sensor could, for example, be constituted by a strain gauge mounted between drive gear 57 and arm member 25 and calibrated to provide an output representative of the torque between them. The torque sensor provides an electrical output signal at 61 indicative of the sensed torque.

A position sensor 60 is located to measure the relative position of the arm members 24, 25 about axis 58. Numerous designs of position sensor are available and could be used for this application. The position sensor could, for example, be constituted by a magnetic sensor attached to one of arm members 24, 25 which counts the passage of magnetic elements attached to the other of the arm members. The position sensor provides an electrical output signal at 62 indicative of the sensed position.

Various modes of operation of the arm will now be described.

When the arm is stationary, or is moving at a constant rate about joint 33, the torque ($T_S$) sensed by the torque sensor 60 depends on the torque ($T_M$) applied by the motor 51, the gear ratio (G) of the gearbox 53, the torque loss ($T_L$) in the gearbox 53, the torque ($T_G$) applied on the joint 33 as a result of the effect of gravity on the arm distal of the joint 33 and the torque ($T_F$) due to other forces acting on the arm distal of the joint 33. The relationship between these can be modelled in advance, and may be of the form:

$$T_S = (T_M \cdot G - T_L) + T_G + T_F$$

The loss behaviour of the gearbox depends on its construction. The torque loss in the gearbox may be substantially constant with load and/or speed, or it may vary in dependence on those or other factors. With this in mind, $T_L$ may be taken to be constant or non-constant. $T_L$ may be modelled as a function of other variables, including $T_M$, depending on the general performance of the gearbox that is being used.

In a first operational mode, the processor 42 estimates the torque $T_F$ due to external forces on the arm, and uses that for one or both of (a) generating force feedback to an operator in dependence on the estimated torque and (b) generating drive signals to the arm so that the arm can either resist or move in the same direction as the applied torque. Motion of the latter sense can give the arm the impression of being compliant in response to externally applied threes even though the joints of the arm might not be back-drivable.

To estimate $T_F$ when the arm is in use the processor 42 can take the following approach. The control unit 41 knows the power that it is supplying to motor 51, and can estimate $T_M$ from a model of the motor's performance stored in non-transient form in memory 43. The processor knows the configuration or pose of the arm from the data provided by the position sensors at each of the joints. The memory 43 stores data indicating the masses and centres of gravity of the various components of the arm and the instrument 29. The processor can estimate $T_G$ from the positional configuration information together with the stored mass and centre of gravity information. The processor is provided with $T_S$ from sensor 59. The value of G will be fixed for a constant-ratio gearbox and can be stored in the memory 43; or in the case of a variable-ratio gearbox, determined from a sensor that indicates the current gearbox state. If $T_L$ is known, or can be estimated, then the processor can estimate $T_F$ using the relationship given above.

In a second operational mode the processor can control the arm to estimate $T_L$. Once estimated, the value of $T_L$, or the function describing it, can be used to derive values of $T_F$ in real time, for the reasons described above.

A first method to estimate $T_L$ is for the processor 42 to apply a known drive power to the motor 51 when the part of the arm distal of joint 33 is not under an external load other than gravity, and to measure the resulting torque at sensor 59. In this situation $T_F$ is zero, and so $T_L$ can be derived from the relationship given above. In this calibration mode if the amount that the arm is moved during the calibration is small then $T_G$ can be read from the torque sensor when the arm is stationary prior to the estimation process. Alternatively, $T_G$ can be estimated from the pose of the arm and the mass distribution data stored in the memory 43.

In a second method for estimating $T_L$, again the processor 42 applies a known drive power to the motor 51 when the part of the arm distal of joint 33 is not under external load other than gravity. In this method, the processor estimates the inertia about joint 33 of the part of the arm distal of joint 33. This can be done from the arm pose as sensed by the position sensors at the various joints, and knowledge of the mass distribution of the part of the arm distal of joint 33 as indicated by data stored in memory 43. The energy applied to the motor will cause motion about joint 33. The processor estimates the angular acceleration of the part of the arm distal of joint 33 about joint 33. That angular acceleration can be estimated by the processor 42 calculating the second differential of the output of the position sensor 60. This allows the processor to estimate the torque applied to the arm as the product of the inertia and angular acceleration. The applied torque can be taken to be equal to $T_M \cdot G - T_L$. $T_M$ and $G$ can be determined as described above, and hence $T_L$ can be estimated. This approach can be used even if there is no torque sensor at joint 33. Furthermore, even if there is a torque sensor at joint 33 this method avoids the need to correct for any static torque on the torque sensor prior to the estimation operation.

$T_L$ may in some circumstances vary whilst the robot is in operation. This may, for example, be due to an increase in the temperature of the gearbox reducing the viscosity of the gearbox lubricant as the robot is used. The estimation methods described above may be performed during an initialisation procedure, or during a pause in a procedure that is being performed by the robot. If the methods are performed during a procedure then it is possible that an instrument carried by the arm is in use: for example inserted in an incision in a patient. If the arm has sufficient degrees of freedom it is possible for the arm to be moved to a different pose whilst the instrument remains at the same location, by virtue of the distal part of the arm to which the instrument is attached remaining in the same location and in the same orientation.

In order to accurately estimate the inertia of, or the torque imposed by, the part of the arm distal of joint 33 it may be useful for the processor 42 to know the mass of the instrument 29 and its mass distribution with respect to its mounting point to the arm. The processor may know which instrument is attached to the arm by means of a communication interface built into the attachment mechanism between the arm and the instrument. The instrument may comprise an identifier which is detectable by the attachment, and the attachment may then signal the processor 42 with the type or identity of the tool. The processor may store a database of available tools and the masses and mass distributions of each. In this way the processor can calculate the inertia or gravitational torque from the distal part of the aim together with the instrument currently borne by the arm.

Another way to estimate the inertia of the portion of the arm distal of the joint 33, together with any instrument, is to supply known power to the motor to drive motion at the joint in opposite directions in succession. In one direction gravity will be opposing the motion as driven by the motor, and in the other direction gravity will be supporting the motion as driven by the motor. The effect of gravity can be compensated for by considering the difference between the acceleration of the arm about the joint in the two directions.

Depending on the constraints on the positioning of the arm, it may be possible to remove the effect of gravity on the torque at the joint by moving the arm to a position where the rotation axis of the joint is vertical. This position may be identified by moving the joint(s) of the arm proximal of the joint 33 to a particular position. The position may be identified from the position sensors of the joints proximal of the joint 33, or by the static torque measured by the torque sensor 59 at joint 33 reaching zero.

Although the process of estimating gearbox losses has been described above in relation to one joint of the arm, it may be applied to any joint of the arm. It may conveniently be applied to each joint in turn during a start-up routine, so as to characterise gearbox losses in each gearbox of the arm in turn.

In the example given above joint 33 is a revolute joint. The joint whose gearbox losses are estimated could offer motion of another sense, for example linear, cylindrical or spherical motion.

If the arm is a surgical arm the instrument provided at its distal end is conveniently a surgical instrument. The arm may be an arm intended for other purposes than surgery. For example, the arm may be intended for manufacturing or materials processing purposes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A robot comprising:
   a base;
   an articulated arm extending distally of the base and including two arm members coupled by a joint;
   a motor;
   a gearbox mounted to one of the arm members having an input shaft coupled to an output of the motor and an output shaft configured to drive relative motion of the arm members about the joint;
   a torque sensor at the joint configured to sense a torque applied between the output shaft of the gearbox and the other of the arm members; and a control system coupled to the arm configured to drive the motor, the control system being arranged to estimate a torque applied on the joint due to external forces on the arm by (i) estimating the torque applied by the motor; (ii) receiving, from the torque sensor, torque data indicating the torque applied between the output shaft of the gearbox and the other of the arm members; and (iii) estimating the torque applied on the joint due to external forces on the arm in dependence on a torque loss in the gearbox, the estimated torque applied by the motor and the torque data.

2. A robot as claimed in claim 1, wherein the control system is configured to generate a force feedback to an operator of the robot in dependence on the estimated torque applied on the joint due to external forces on the arm.

3. A robot as claimed in claim 1, wherein the control system is configured to generate a drive signal for the motor so that the articulated arm resists the torque applied on the joint due to external forces on the arm.

4. A robot as claimed in claim 1, wherein the control system is configured to generate a drive signal for the motor so that the arm moves in the same direction as the motion caused by the torque applied on the joint due to external forces on the arm.

5. A robot as claimed in claim 1, further comprising a position sensor configured to sense relative position of the arm members about the joint.

6. A robot as claimed in claim 5, wherein the control system is configured to receive from the position sensor position data indicating the motion of the arm in response to an applied drive power and estimate the torque loss in the gearbox in dependence on a second derivative of the position data.

7. A robot as claimed in claim 5, wherein the control system is configured to receive from the position sensor position data and estimate the torque applied on the joint as a result of the effect of gravity in dependence on the position data.

8. A robot as claimed in claim 7, wherein the control system is configured to estimate the torque applied on the joint due to external forces on the arm in dependence on the torque applied on the joint as a result of the effect of gravity.

9. A robot as claimed in claim 5, wherein the control system is further arranged to perform a calibration operation to estimate torque loss in the gearbox by the steps of (i) estimating the inertia of the portion of the arm distal of the joint for motion about the joint; (ii) applying a determined drive power to the motor; (iii) receiving from the position sensor position data indicating the motion of the arm in response to the applied drive power; and (iv) estimating the torque loss in the gearbox in dependence on the estimated inertia, the determined drive power and the position data.

10. A robot as claimed in claim 9, wherein the joint is a revolute joint and the estimated inertia is the rotational inertia of the portion of the arm distal of the joint for motion about the rotation axis of the joint.

11. A robot as claimed in claim 9, wherein the joint is a linear joint and the estimated inertia is the linear inertia of the portion of the arm distal of the joint for motion along the motion axis of the joint.

12. A robot as claimed in claim 9, wherein the portion of the arm distal of the said joint comprises one or more further joints and one or more further position sensors configured to sense the configuration of those joints, and the calibration operation comprises receiving from the further position sensors further position data indicating the configuration of the portion of the arm distal of the said joint and estimating the inertia of the portion of the arm distal of the said joint for motion about the said joint in dependence on the further position data.

13. A robot as claimed in claim 12, wherein the control system comprises a memory storing mass distribution data indicating the mass distribution of each rigid portion of the arm distal of the said joint and estimating the inertia of the portion of the arm distal of the said joint for motion about the said joint is performed in dependence on the further position data and the mass distribution data.

14. A robot as claimed in claim 13, wherein there is a tool attached at a distal end of the arm, the control system comprises a memory storing tool mass distribution data indicating the mass distribution of the tool and estimating the inertia of the portion of the arm distal of tool is performed in dependence on the further position data and the tool mass distribution data.

15. A robot as claimed in claim 9, wherein the control system is configured to perform the calibration operation by applying a determined drive power to the motor to drive motion at the joint in a first direction and in a second direction, and to estimate the inertia of the portion of the arm distal of the joint for motion about the joint in dependence on position data received from the position sensor due to motion at the joint in both the first and second directions.

16. A robot as claimed in claim 9, wherein the robot arm has sufficient degrees of freedom that it is capable of adopting multiple configurations whilst the distal end of the arm remains stationary, and the control system is configured to perform the calibration operation whilst controlling the configuration of joints of the arm other than the said joint so as to keep the distal end of the arm substantially stationary during the calibration operation.

17. A robot as claimed in claim 1, wherein the torque sensor is mounted between the drive gear and a body of the arm member.

18. A robot as claimed in claim 1, having a surgical instrument attached at the distal end of the arm.

19. A robot as claimed in claim 1, wherein the robot is a surgical robot.

20. A method for estimating a torque on a robot comprising a base; an articulated arm extending distally of the base and including two arm members coupled by a joint; a motor; a gearbox mounted to one of the arm members having an input shaft coupled to an output of the motor and an output shaft configured to drive relative motion of the arm members about the joint; a torque sensor at the joint configured to sense a torque applied between the output shaft of the gearbox and the other of the arm members;

the method estimating a torque applied on the joint due to external forces on the arm by (i) estimating the torque applied by the motor; (ii) receiving, from the torque sensor, torque data indicating the torque applied between the output shaft of the gearbox and the other of the arm members; and (iii) estimating the torque applied on the joint due to external forces on the arm in dependence on a torque loss in the gearbox, the estimated torque applied by the motor and the torque data.

* * * * *